E. H. LOWE.
COVER FOR COOKING POTS.
APPLICATION FILED MAY 5, 1915.
1,230,419.
Patented June 19, 1917.
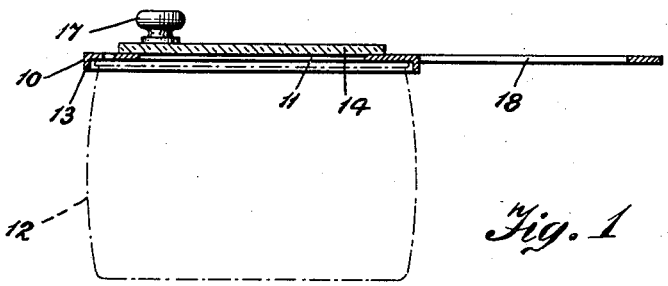
Fig. 1
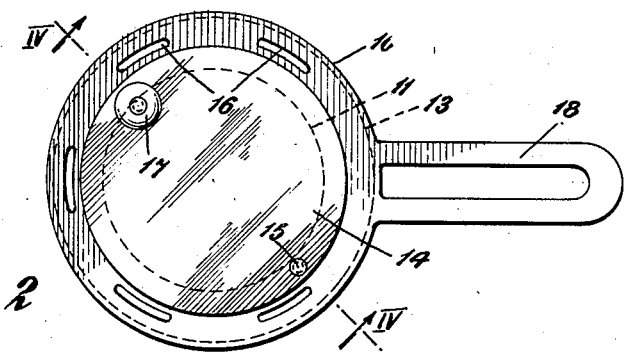
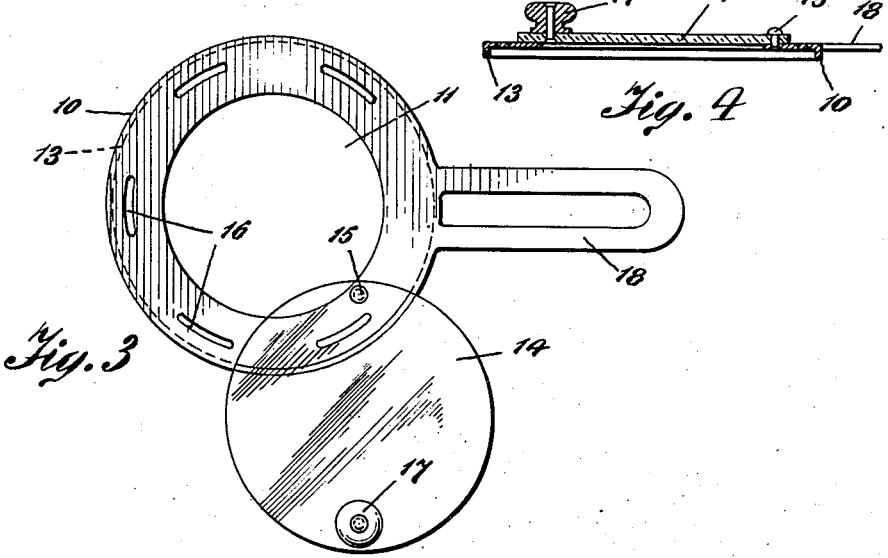
WITNESSES:
INVENTOR
Ella H. Lowe.
BY
W. T. Criswell.
ATTORNEY

UNITED STATES PATENT OFFICE.

ELLA H. LOWE, OF TARRYTOWN, NEW YORK.

COVER FOR COOKING-POTS.

1,230,419. Specification of Letters Patent. Patented June 19, 1917.

Application filed May 5, 1915. Serial No. 25,956.

*To all whom it may concern:*

Be it known that I, ELLA H. LOWE, a citizen of the United States, and a resident of Tarrytown, county of Westchester and State of New York, have invented a certain new and useful Improvement in Covers for Cooking-Pots, of which the following is a full, clear, and exact specification.

This invention relates to a class of devices adapted to be used in the work of cooking.

My invention has for its object primarily to provide a simple and efficient device, or cover designed to be employed in conjunction with a pot, or other container whereby the process of cooking food products therein may be frequently observed as well as permitting seasoning and the like to be added to the food as occasion requires without removing the cover from the container as is incident to the use of the ordinary types of covers which frequently cause the person attending the cooking to be burned, or scalded when lifting, or removing the cover during the procedure of the cooking. This is accomplished mainly by providing an annular member, or supporting plate having an opening centrally therethrough, and on the top of this annular supporting member is movably mounted a plate of glass, or other transparent material so as to be guided to open and close the opening of the supporting member. The supporting member with its transparent plate is adapted to be removably positioned on the open top of a pot, or other container when food products are being cooked therein, the transparent plate serving to permit the cooking process to be observed at desired intervals as well as being adapted to be swung from the opening of the supporting member to allow the food to be seasoned without lifting or removing the cover.

Other objects of the invention are to provide one, or a number of spaced apertures through the supporting member to permit steam, and heat from the cooking food products to escape therethrough, in order to avoid condensation of moisture from collecting on the plate; to provide a handle on the supporting member for permitting the cover to be conveniently applied to or removed from the container; and to provide a handle on the transparent plate so as to be manually swung to and from the opening of the supporting member.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a section taken longitudinally through one form of cover embodying my invention showing the manner of its use in conjunction with a cooking pot.

Fig. 2 is a top plan of the cover with its transparent plate in closed position over the aperture of the cover.

Fig. 3 is a top plan of the cover with its transparent plate swung to an open position, and Fig. 4 is a section taken on the line IV—IV of Fig. 2.

My improved cover for cooking pots comprises an annular supporting member, or plate 10 provided with an opening 11 centrally therethrough, and this plate is preferably flat as well as being circular in shape. This annular supporting plate is of a diameter to adapt it to be applied on a pot, or other container, as 12, used for cooking food products so as to be removably held on the upper edge of the wall of the container to close its open end, and on the outer periphery of the supporting plate is a depending flange, as 13, adapted to overhang the wall of the container for preventing the cover from accidentally sliding therefrom when in use. The opening 11 of the annular supporting member, or plate 10 is of a diameter to permit free access therethrough so that seasoning and the like may be added to the food products, or other contents of the container as well as permitting the contents to be agitated, or otherwise manipulated as occasion requires.

In order to permit the passage through the opening 11 of the supporting plate 10 to be opened and closed, on the top of this plate is a plate 14 of glass, or other transparent material. The transparent plate 14 is larger in dimension than the opening 11 of the supporting plate, and this transparent plate is movably mounted, or pivoted, at 15, to the supporting plate so as to be guided to and from the supporting plate to open and close the opening 11. By employing the transparent plate in this manner, and when the cover is in use on a container, as shown in Fig. 1, the contents of the container when undergoing the process of cooking, or heating may be easily observed, and when it is desired to add seasoning, or other ingredients to the contents the transparent plate is swung to an open position, as shown in Fig. 3, for allowing the ingredients to be delivered into the container through the opening 11 of the supporting member 10 of the cover. Thus the requirement for raising, or removing the cover from the container when in use will be avoided.

To allow a quantity of steam to escape from the cooking ingredients if desired at spaced intervals in the annular supporting plate 10 are a number of orifices 16 which also serve to prevent condensation of moisture from collecting on the transparent plate 14 for maintaining its transparency when the cover is in use. Projecting upwardly from the transparent plate 14 is a handle, or knob 17 to permit the transparent plate to be manually swung to and from the opening 11 of the supporting member, or plate 10. Extending from the outer edge of the flat supporting plate is a handle 18 preferably of U-shaped construction and integral with the supporting plate; the handle being provided with a flat upper surface lying within the same horizontal plane as the flat top surface of the supporting plate itself, (see Fig. 1.) and the pivotal point 15 between the cover and the plate is preferably located at a point fairly close to the juncture of the plate and handle, thereby providing a construction wherein the handle is adapted to form a rest for the glass cover which may be easily slid thereon when in open position, thus greatly lessening the liability of the cover to break and further reducing the strain on the pivotal pin at 15, which strain is present in devices of this character where the cover is permitted to rest solely upon the rim of the plate as is shown in Fig. 3. My device, or cover as thus constructed provides an exceptionally useful culinary utensil whereby the process of cooking food products in a pot, or other container may be properly accomplished without endangering a person to being burned, or scalded while attending the cooking as is incident to the methods at present in use where the covers of containers are often required to be raised, or removed to gain access to the products being cooked.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

A cover for cooking pots and the like, comprising a metallic supporting plate having a centrally disposed opening and a flat upper surface, means for retaining said plate on a pot against lateral movement, a transparent cover pivotally secured to said plate adjacent the edge of the circular opening therein and adapted to be swung to cover and uncover said opening, means on said cover for swinging the same to open and closed position and a U-shaped handle extending from one edge of the plate and integral therewith, said handle having a flat upper surface lying in the same horizontal plane as the flat upper surface of the supporting plate and forming in effect a continuation thereof, the junction between the said plate and handle being located adjacent the pivotal point of the cover and plate thereby adapting said handle to serve as a support for said cover when the latter is in open position substantially as and for the purpose described.

This specification signed and witnessesd this fourth day of May A. D. 1915.

ELLA H. LOWE.

Witnesses:
ROBT. B. ABBOTT,
M. DERMODY.